(12) United States Patent
Sahara (10) Patent No.: US 8,599,942 B2
(45) Date of Patent: Dec. 3, 2013

(54) RECEIVING DEVICE AND ADAPTIVE MODULATION METHOD

(75) Inventor: Toru Sahara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 337 days.

(21) Appl. No.: 12/993,808

(22) PCT Filed: May 28, 2009

(86) PCT No.: PCT/JP2009/059761
§ 371 (c)(1),
(2), (4) Date: Nov. 19, 2010

(87) PCT Pub. No.: WO2009/145252
PCT Pub. Date: Dec. 3, 2009

(65) Prior Publication Data
US 2011/0069786 A1 Mar. 24, 2011

(30) Foreign Application Priority Data
May 28, 2008 (JP) ................................ 2008-139691

(51) Int. Cl.
*H04L 27/28* (2006.01)
*H04B 7/00* (2006.01)

(52) U.S. Cl.
USPC ............................................ 375/260; 455/70

(58) Field of Classification Search
USPC ......... 375/260, 262, 265, 267, 316, 324, 325, 375/340, 341; 370/208, 210, 310; 455/67.11, 67.14, 69, 70
See application file for complete search history.

(56) References Cited

U.S. PATENT DOCUMENTS

| 2009/0052573 A1* | 2/2009 | Tiedemann et al. | 375/295 |
| 2009/0088083 A1* | 4/2009 | Fujii et al. | 455/69 |
| 2009/0325623 A1* | 12/2009 | Morita et al. | 455/522 |

FOREIGN PATENT DOCUMENTS

| JP | 2002-290246 A | 10/2002 |
| JP | 2005-318533 A | 11/2005 |
| JP | 2007-281780 A | 10/2007 |

OTHER PUBLICATIONS

Association of Radio Industries and Businesses, OFDMA/TDMA TDD Broadband Wireless Access System (Next Generation PHS), ARIB STD-T95, Version 1.0, Dec. 12, 2007.

International Search Report dated Jul. 28, 2009, issued by the Japanese Patent Office for International Application No. PCT/JP2009/059791.

* cited by examiner

*Primary Examiner* — Young T. Tse
(74) *Attorney, Agent, or Firm* — Procopio, Cory, Hargreaves & Savitch LLP (57) ABSTRACT

A mobile station (12) includes an AGC unit (24) for controlling the received power of a communication signal sent from a base station via at least one of the subchannels, based on the maximum received power of a signal received together with the communication signal by any of the subchannels; a received power difference detecting unit (30) for detecting the received power difference between the maximum received power of a signal sent from the base station and the maximum received power of a signal arriving from a device different from the base station; and a modulation and coding scheme determining unit (38) for determining a modulation and coding scheme for a new communication signal to be sent from the base station, based on the signal quality of the communication signal subjected to received power control by the AGC unit (24) and the received power difference detected.

8 Claims, 5 Drawing Sheets

FIG.3

| MODULATION AND CODING SCHEME | REQUIRED SINR (dB) |
|---|---|
| 256QAM | ..... |
| 64QAM | ..... |
| 16QAM | ..... |
| QPSK | ..... |
| BPSK | ..... |

RECEIVING DEVICE AND ADAPTIVE MODULATION METHOD

TECHNICAL FIELD

The present invention relates to a receiving device and an adaptive modulation method and, in particular, to a wireless communication technique utilizing an orthogonal frequency division multiple access system.

BACKGROUND ART

A recent wireless communication system employs an adaptive modulation scheme for switching modulation and coding schemes for a radio signal, depending on varying transmission path environment.

For example, in a next generation PHS (next generation Personal Handy-phone System) employing the OFDMA (Orthogonal Frequency Division Multiple Access) system, a mobile station determines a modulation and coding scheme, based on an SINR (a signal to interference and noise ratio) which indicates signal quality of a received communication signal, and sends a modulation and coding scheme request (MR: MCR request) containing the determined modulation and coding scheme (MCS) to a base station (see the non-patent document 1 mentioned below).

In such a wireless communication system, generally, modulation and coding scheme for a communication signal to be sent from a transmitting device to a receiving device is determined, based on signal quality subjected to received power control through AGC (automatic gain control).

RELATED ART DOCUMENT

Non-Patent Document 1: "ARIB STD T95 'OFDMA/TDMA TDD Broadband Wireless Access System (Next Generation PHS) ARIB STANDARD' Ver. 1.0", Dec. 12, 2007 Association of Radio Industries and Businesses

DISCLOSURE OF THE INVENTION

Problems to be Solved by the Invention

In a receiving device of a wireless communication system, such as the above described next generation PHS, which employs the OFDMA system in addition to the adaptive modulation scheme, it is not possible to perform AGC for every subchannel. Therefore, the received power of a communication signal is controlled, based on the maximum received power of a signal received at the same time with the communication signal via any subchannel within a receive band.

Therefore, if a, strong input signal having a power stronger than the maximum received power of a signal sent from a transmitting device (e.g., the received power of a control signal) intermittently arrives at a receiving device, the lower limit (noise power) of the dynamic range (i.e., the range of a received power receivable to a receiving circuit) temporarily rises due to the received power of the strong input signal. This may cause demodulation error of a communication signal to which the modulation and coding scheme before the rise of the dynamic range lower limit is applied.

The present invention has been conceived in view of the above described problem, and an object thereof is to provide a receiving device and an adaptive modulation method capable of reducing demodulation error of a communication signal due to a signal intermittently arriving from a device different from a transmitting device in a wireless communication system employing an adaptive modulation scheme and the OFDMA system.

Means for Solving the Problems

In order to solve the above described problem, a receiving device according to the present invention is a receiving device, including received power control means for controlling a received power of a communication signal sent from a transmitting device via at least one of subchannels according to an orthogonal frequency division multiple access system, depending on a maximum received power of a signal received together with the communication signal via any of the subchannels; and modulation and coding scheme determining means for determining a modulation and coding scheme for a new communication signal to be sent from the transmitting device, based on signal quality of the communication signal subjected to received power control by the received power control means, the receiving device for requesting the transmitting device to send the new communication signal, using the modulation and coding scheme determined by the modulation and coding scheme determining means, the receiving device further including received power difference detecting means for detecting a received power difference between a maximum received power of a signal sent from the transmitting device and a maximum received power of a signal arriving from a device different from the transmitting device, in which the modulation and coding scheme determining means determines the modulation and coding scheme of the new communication signal, based further on the received power difference detected by the received power difference detecting means.

The receiving device according to the present invention determines a modulation and coding scheme for a new communication signal to be sent from the transmitting device, based not only on the signal quality of a communication signal subjected to received power control but also on the received power difference between the maximum received power of a signal sent from the transmitting device and the maximum received power of a signal arriving from a device different from the transmitting device. Therefore, according to the present invention, demodulation error of a communication signal due to a signal intermittently arriving from a device different from the transmitting device can be reduced.

Further, in one aspect of the present invention, the receiving device may further include cycle detecting means for detecting a cycle in which the maximum received power of the signal arriving from the device different from the transmitting device exceeds the maximum received power of the signal sent from the transmitting device, in which the modulation and coding scheme determining means may determine the modulation and coding scheme for the new communication signal, based further on the cycle detected by the cycle detecting means.

According to this aspect, demodulation error of a communication signal due to a strong input signal cyclically arriving from a device different from the transmitting device can be reduced.

In another aspect of the present invention, the modulation and coding scheme determining means may determine the modulation and coding scheme for the new communication signal, based on the received power difference detected by the received power difference detecting means, at time points corresponding to the cycle detected by the cycle detecting means.

According to this aspect, as a modulation and coding scheme for a communication signal is changed at time points corresponding to the arriving cycle of a strong input signal cyclically arriving from a device different from the transmitting device, demodulation error of a communication signal due to the strong input signal can be reduced while suppressing drop in throughput.

In another aspect of the present invention, the cycle detecting means may detect the cycle in which a received power of a control signal sent from an adjacent transmitting device adjacent to the transmitting device exceeds a received power of a control signal sent from the transmitting device, and the received power difference detecting means may detect a received power difference between the received power of the control signal sent from the transmitting device and the received power of the control signal sent from the adjacent transmitting device.

According to this aspect, demodulation error of a communication signal due to a control signal cyclically sent from an adjacent transmitting device can be preferably reduced.

In another aspect of the present invention, the receiving device may further include frequency detecting means for detecting a frequency with which the maximum received power of the signal arriving from the device different from the transmitting device exceeds the maximum received power of the signal sent from the transmitting device, in which the modulation and coding scheme determining means may determine the modulation and coding scheme for the new communication signal, based further on the frequency detected by the frequency detecting means.

According to this aspect, demodulation error of a communication signal due to a strong input signal intermittently arriving from a device different from the transmitting device can be reduced.

In another aspect of the present invention, the modulation and coding scheme-determining means may determine the modulation and coding scheme for the new communication signal, based on whether or not the frequency detected by the frequency detecting means is equal to or larger than a predetermined value.

According to this aspect, demodulation error of a communication signal due to a strong input signal arriving with a frequency equal to or more than a predetermined frequency from a device different from the transmitting device can be preferably reduced.

In another aspect of the present invention, the receiving device may further include estimated throughput comparing means for comparing, under a condition that the maximum received power of the signal arriving from the device different from the transmitting device exceeds the maximum received power of the signal sent from the transmitting device with the frequency detected by the frequency detecting means, an estimated throughput in a case where a modulation and coding scheme determined irrespective of the received power difference is applied and an estimated throughput in a case where the modulation and coding scheme determined based on the received power difference is applied, in which the modulation and coding scheme determining means may determine the modulation and coding scheme for the new communication signal, based on a result of comparison by the estimated throughput comparing means.

According to this aspect, whether or not it is necessary to change the modulation and coding scheme in order to increase the throughput can be determined, based on the frequency with which a strong input signal arrives from a device different from the transmitting device.

An adaptive modulation method according to the present invention includes a step of controlling a received power of a communication signal sent from a transmitting device via at least one of subchannels according to an orthogonal frequency division multiple access system, depending on a maximum received power of a signal received together with the communication signal via any of the subchannels; a step of detecting a received power difference between a maximum received power of a signal sent from the transmitting device and a maximum received power of a signal arriving from a device different from the transmitting device; a step of determining a modulation and coding scheme for a new communication signal to be sent from the transmitting device, based on signal quality of the communication signal subjected to received power control and the received power difference detected; and a step of having the transmitting device send the new communication signal, using the modulation and coding scheme determined.

BEST MODE FOR CARRYING OUT THE INVENTION

In the following, one embodiment of the present invention will be described in detail based on the drawings.

Figure 1:
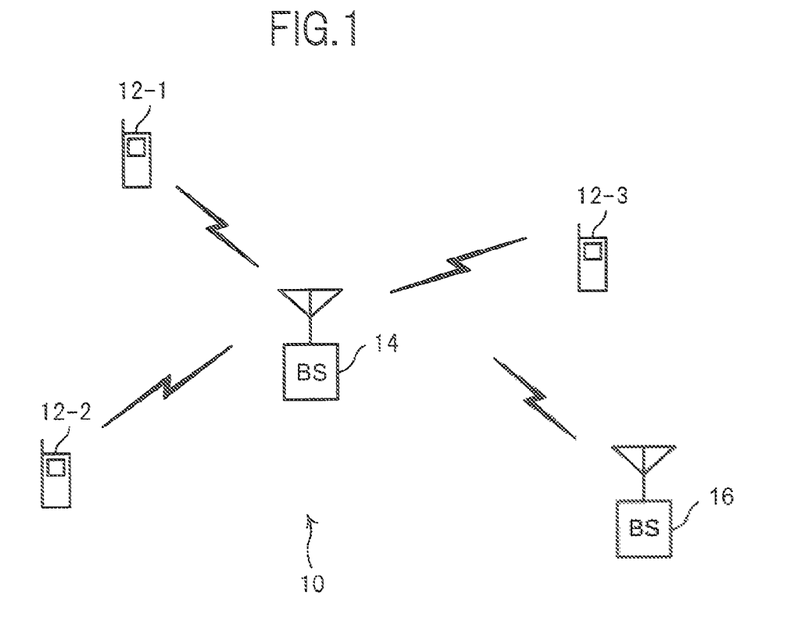
FIG. 1 is an entire configuration diagram of a mobile communication system according to an embodiment of the present invention.

FIG. 1 is an entire configuration diagram of a mobile communication system 10 according to an embodiment of the present invention. As shown in the diagram, the mobile communication system 10 includes a plurality of mobile stations 12 (only mobile stations 12-1 to 12-3 are shown here) and a base station 14 (only one is shown here).

The base station 14 employs the OFDMA system and the TDMA/TDD (Time Division Multiple Access/Time Division Duplex) system, and communicates with respective mobile stations 12, using at least one radio channel composed of a combination of a time slot according to the TDMA and a subchannel according to the OFDMA.

The mobile communication system 10 employs an adaptive modulation scheme for switching modulation and coding schemes for a radio signal, depending on a transmission path environment. According to the adaptive modulation scheme, a mobile station 12 communicating with the base station 14 determines a modulation and coding scheme for a new communication signal to be sent from the base station 14, based not only on the received signal quality (e.g., an SINR subjected to received power control through AGC) of a communication signal sent from the base station 14 but also on the received power difference between the maximum received power of a signal sent from the base station 14 (the received power of a control signal here) and the maximum received power of a signal arriving from a device different from the base station 14 (the received power of a control signal cyclically sent from another base station 16 adjacent to the base station 14). With this arrangement, the mobile station 12 can reduce demodulation error of a communication signal due to a signal intermittently arriving from a device different from the base station 14 communicating with the mobile station 12.

In the following, a structure provided to the mobile station 12 to realize the above described process will be described.

Figure 2:
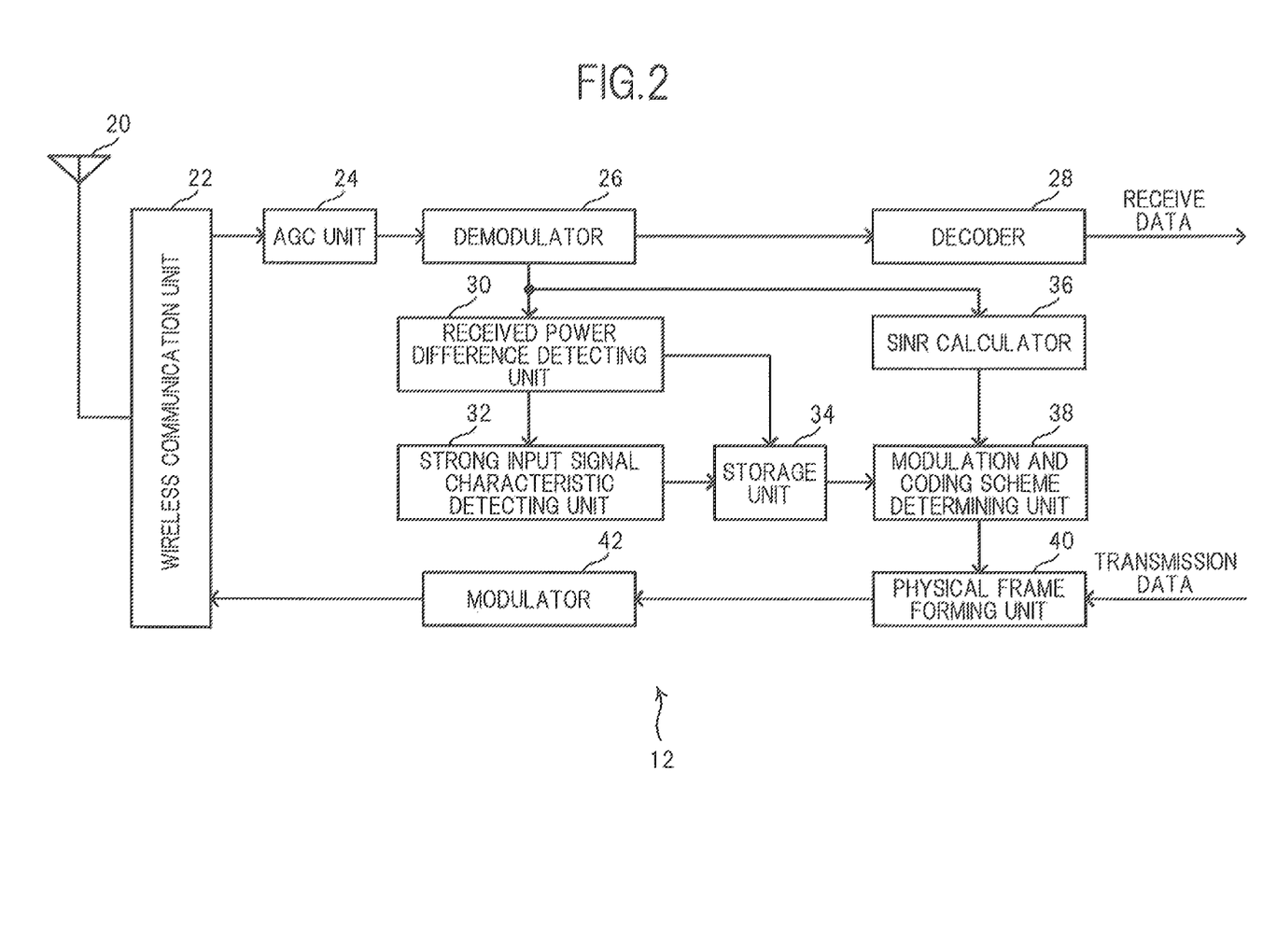
FIG. 2 is a functional block diagram of a mobile station according to the embodiment of the present invention.

FIG. 2 is a functional block diagram of the mobile station 12. As shown in the diagram, the mobile station 12 includes an antenna 20, a wireless communication unit 22, an AGC unit 24, a demodulator 26, a decoder 28, a received power difference detecting unit 30, a strong input signal characteristic detecting unit 32, a storage unit 34, an SINR calculator 36, a modulation and coding scheme determining unit 38, a physical frame forming unit 40, and a modulator 42. Among these elements, the decoder 28, the received power difference detecting unit 30, the strong input signal characteristic detecting unit 32, the SINR calculator 36, the modulation and coding scheme determining unit 38, the physical frame forming unit 40, and the modulator 42 are built from, e.g., a CPU (Central Processing Unit) or a DSP (Digital Signal Processor).

The antenna 20 receives a radio signal containing a signal sent from the base station 14 (a control signal, a communication signal, and so forth), and outputs the received radio signal to the wireless communication unit 22. Also, the antenna 20 sends a radio signal supplied from the wireless communication unit 22 to the base station 14. Reception and transmission of a radio signal is switched in response to an instruction from the wireless communication unit 22 in a time division manner.

The wireless communication unit 22 includes a low noise amplifier, a power amplifier, a local oscillator, a mixer, and a filter. The wireless communication unit 22 amplifies a radio signal input from the antenna 20, using the low noise amplifier, and down-converts the amplified radio signal into an intermediate frequency signal before outputting to the AGC unit 24. Also, the wireless communication unit 22 up-converts a modulated signal input from the modulator 42 into a radio signal, and amplifies the resultant signal, using the power amplifier, up to a transmission power level before supplying to the antenna 20.

The AGC unit 24 is a variable gain amplifier for controlling, based on the maximum received power of a signal input from the wireless communication unit 22, the received power of the signal. Specifically, the AGC unit 24 amplifies or attenuates the received power of a signal input from the wireless communication unit 22 over the entire receive band such that the maximum received power of the signal defines the upper limit of the dynamic range.

In the mobile communication system 10, in which a plurality of OFDMA subchannels are defined in the receive band, the received power of a communication signal sent from the base station 14 via at least one of these subchannels is controlled, depending on the maximum received power of a signal received by any subchannel within the receive band.

The demodulator 26 includes an A/D converter, a serial/parallel converter, an FFT (Fast Fourier Transform) operating unit, and a parallel/serial converter. The demodulator 26 carries out guard interval (GI) removal, A/D conversion, serial/parallel conversion, discrete Fourier transform, parallel/serial conversion, and so forth, with respect to a signal subjected to received power control and input from the AGC unit 24 to thereby obtain a successive complex symbol string. The thus obtained complex symbol string is output to the decoder 28. Also, the demodulator 26 divides the complex symbols of respective subcarriers obtained in the discrete Fourier transform into subchannels, and then supplies the divided complex symbols of respective subchannels to the received power difference detecting unit 30 and the SINR calculator 36.

The decoder 28 decodes the complex symbol string input from the demodulator 26 to restore receive data in accordance with the modulation and coding scheme of the symbol, and outputs the restored receive data to a higher layer (not shown).

The received power difference detecting unit 30 detects the received power difference between the received power of a control signal sent from the base station 14 (the maximum received power of a signal sent from the base station 14) and the received power of a control signal cyclically sent with a predetermined interval from another base station adjacent to the base station 14 (hereinafter referred to as an "adjacent base station") (the maximum received power of a signal arriving from a device different from the base station 14), based on the complex symbols of the respective subchannels input from the demodulator 26. Note that it is assumed here that a positive received power difference is resulted when the received power of a control signal sent from the base station 14 exceeds the received power of a control signal sent from an adjacent base station. The detected received power difference is stored in the storage unit 34.

Based on the received power difference detected by the received power difference detecting unit 30, the strong input signal characteristic detecting unit 32 detecting a cycle in which the received power of a control signal cyclically sent with a predetermined interval from the adjacent base station exceeds the received power of a control signal sent from the base station 14, that is, a cycle in which the received power difference detected by the received power difference detecting unit 30 is resulted negative. The detected cycle is stored in the storage unit 34.

Figure 3:
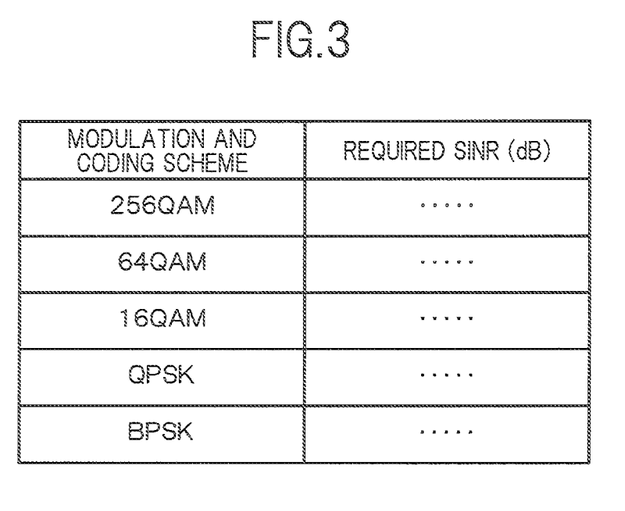
FIG. 3 is a diagram showing one example of required SINR's of respective modulation and coding schemes (a required SINR table)

The storage unit 34 includes, e.g., semiconductor memory elements, and stores the received power difference detected by the received power difference detecting unit 30, the cycle detected by the strong input signal characteristic detecting unit 32, the required SINR's of respective modulation and coding schemes (a required SINR table) shown in FIG. 3, and so forth. Note that the received power difference and the cycle stored in the storage unit 34 are updated to information sequentially detected by the received power difference detecting unit 30 and the strong input signal characteristic detecting unit 32.

The SINR calculator 36 calculates the SINR (one aspect of signal quality) of a communication signal sent from the base station. 14 via at least one subchannel, based on the complex symbols of respective subchannels input from the demodulator 26.

The modulation and coding scheme determining unit 38 determines a modulation and coding scheme for a new communication signal to be sent from the base station 14, based on the SINR of the communication signal, calculated by the SINR calculator 36, and the received power difference, cycle, and required SINR table, stored in the storage unit 34.

In the following, a method for determining a modulation and coding scheme by the modulation and coding scheme determining unit 38 will be specifically described.

Figure 4A:
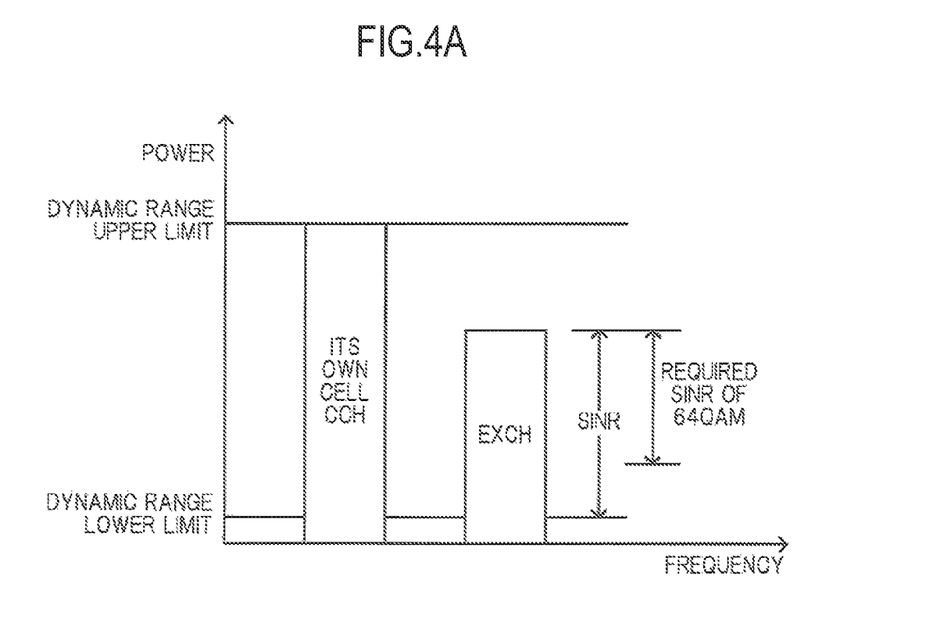
FIG. 4A and FIG. 4B are diagrams explaining variation of a dynamic range due to a control signal sent from an adjacent base station.
Figure 4B:
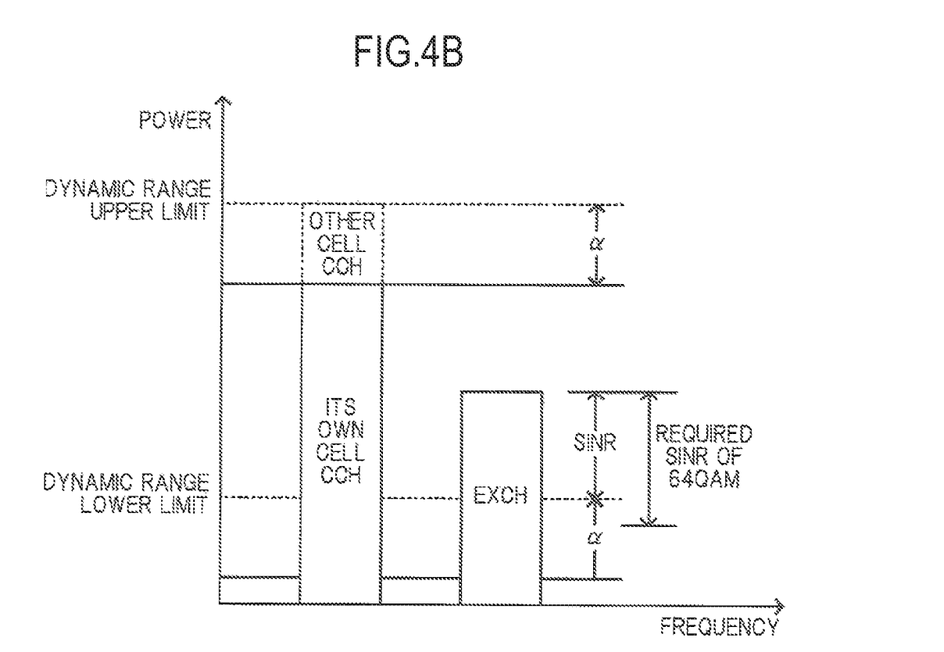

FIG. 4A and FIG. 4B are diagrams showing variation of a dynamic range due to a control signal cyclically sent with a predetermined interval from an adjacent base station (denoted as "other cell CCH": common channel). Specifically, FIG. 4A shows a dynamic range before arrival of a control signal from an adjacent base station; FIG. 4B shows a dynamic range after arrival of a control signal from an adjacent base station.

As shown in FIG. 4A, before arrival from an adjacent base station, of a control signal having a power stronger than the received power of a control signal sent from the base station 14 (denoted as "its own cell CCH"), the AGC unit 24 carries out received power control such that the received power of a control signal from the base station 14 (its own cell CCH) defines the upper limit of the dynamic range. In this example, as the SINR of a communication signal (denoted as an EXCH (Extra Channel)) sent from the base station 14 is higher than the required SINR of 64QAM (though assumed lower than the required SINR of 256QAM), the modulation and coding scheme determining unit 38 determines 64QAM as a modulation and coding scheme (MCS) for a new communication signal to be requested to the base station 14.

In the above, when a control signal having a power stronger than the received power of a control signal sent from the base station 14 (its own cell CCH) arrives from an adjacent base station, the AGC unit 24 carries out received power control such that the received power of the control signal arriving from the adjacent base station (other cell CCH) defines the upper limit of the dynamic range, as shown in FIG. 4B. Accordingly, the lower limit of the dynamic range rises, compared to the lower limit shown in FIG. 4A, by an amount corresponding to the received power difference α between the respective control signals ("the received power of the other cell CCH"-"the received power of its own cell CCH"). In this case, however, the SINR of a communication signal (EXCH) sent from the base station 14 is resultantly smaller than the required SINR of 64QAM, error will occur in demodulating the communication signal (EXCH) having been modulated using 64QAM.

Figure 5:
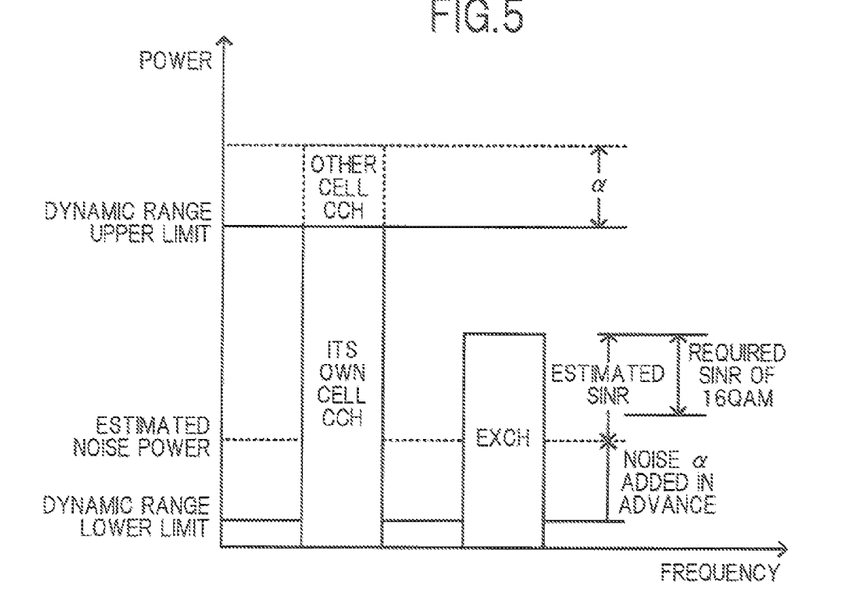
FIG. 5 is a diagram explaining a method for deciding a modulation and coding scheme in prospect of variation of a dynamic range.

To address the above, in this embodiment, as shown in FIG. 5, the lower limit of the dynamic range is risen by the amount of a noise power corresponding to the above described received power difference a in prospect of variation of a dynamic range (i.e., the rise of the lower limit) due to the control signal arriving from the adjacent base station (other cell CCH), and 16QAM is determined as a modulation and coding scheme (MCS) for a new communication signal to be requested to the base station 14.

That is, in a case where the received power difference stored in the storage unit 34 cyclically becomes negative (i.e., when the received power of a control signal cyclically sent from the adjacent base station exceeds the received power of a control signal sent from the base station 14), the modulation and coding scheme determining, unit 38 calculates an estimated SINR by adding the received power difference (−α) stored in the storage unit 34 to the SINR of the communication signal (EXCH) calculated by the SINR calculator 36, and then selects from the required SINR table the optimum modulation and coding scheme which is applicable with the estimated SINR. For example, in the case shown in FIG. 5, in which the estimated SINR of the communication signal (EXCH) is higher than the required SINR of 16QAM (though assumed lower than the required SINR of 64QAM), the modulation and coding scheme determining unit 38 determines 16QAM as a modulation and coding scheme (MCS) for a new communication signal to be requested to the base station 14. With this arrangement, demodulation error of a communication signal due to a control signal cyclically sent from an adjacent base station can be reduced.

Note that based on the cycle stored in the storage unit 34, the modulation and coding scheme determining unit 38 may anticipate a time when the received power of a control signal sent from the adjacent base station exceeds the received power of a control signal sent from the base station 14, and determine a modulation and coding scheme to request, based on the anticipated time, using the method described above with reference to FIG. 5. That is, the modulation and coding scheme determining unit 38 may anticipate a time when a control signal arrives from the adjacent base station, and determine a modulation and coding scheme to request so that a modulation and coding scheme based on the estimated SINR in prospect of the rise of the lower limit of the dynamic range is applied at the anticipated time. This arrangement minimizes the period of time during which a modulation and coding scheme with a required SINR lower than the actual SINR obtained by the SINR calculator 36 is applied, so that demodulation error of a communication signal due to a control signal cyclically sent from an adjacent base station can be reduced while suppressing drop in throughput.

The physical frame forming unit 40 stores transmission data input from a higher layer (not shown) in a physical frame corresponding to a communication signal (e.g., an EXCH), and outputs the physical frame to the modulator 42. Also, the physical frame forming unit 40 includes a modulation and coding scheme request (MR) containing the modulation and coding scheme (MCS) determined by the modulation and coding scheme determining unit 38, in the MR field of a physical frame corresponding to a predetermined uplink communication signal (e.g., an ANCH (anchor channel)), and outputs the physical frame to the modulator 42.

The modulator 42 includes a serial/parallel converter, an IFFT (Inverse Fast Fourier Transform) operating unit, a parallel/serial converter, and a D/A converter. The modulator 42 carries out symbol mapping (amplitude and phase allocation) in accordance with the modulation and coding scheme determined by the modulation and coding scheme determining unit 38 with respect to a physical frame input from the physical frame forming unit 40 to thereby obtain a complex symbol string. Further, the modulator 42 carries out serial/parallel conversion, inverse discrete Fourier transform, parallel/serial conversion, D/A conversion, and so forth, with respect to the respective carrier components of the obtained complex symbol string to thereby obtain a baseband OFDM signal. The thus obtained baseband OFDM signal is given GI before being output to the wireless communication unit 22.

Figure 6:
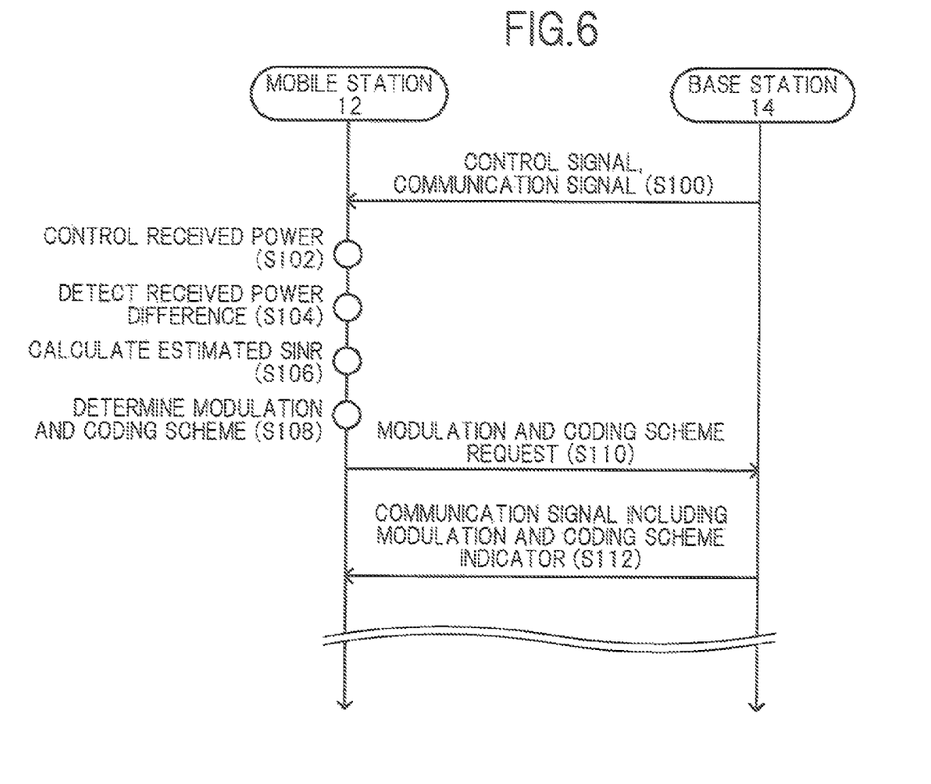
FIG. 6 is a diagram showing one example of an adaptive modulation sequence according to the embodiment of the present invention.

In the following, one example of an adaptive modulation sequence to be carried out between the mobile station 12 and the base station 14 will be described, referring to FIG. 6. Assume here that a control signal having a power stronger than that of a control signal from the base station 14 arrives intermittently at the mobile station 12 from the adjacent base station.

As shown in the diagram, when the base station 14 sends a control signal and a communication signal to the mobile station 12 (S100), the mobile station 12 controls the received signal power of a radio signal received together with the control signal and the communication signal such that the maximum received power of the signal (the received power of a control signal arriving from the adjacent base station) defines the upper limit of the dynamic range (S102).

Then, based on the receive signal subjected to received power control, the mobile station 12 detects the received power difference between the received power of the control signal sent from the base station 14 and the received power of the control signal sent from the adjacent base station (S104). Further, the mobile station 12 calculates the SINR of the communication signal, based on the received signal subjected to received power control, and then calculates an estimated SINR by adding the received power difference (a negative value) detected at S104 to the SINR (S106). Thereafter, the mobile station 12 selects from the required SINR table the optimum modulation and coding scheme which is applicable with the estimated SINR to determine the selected scheme as a modulation and coding scheme (MCS) to notify, the base station 14 (S108). The thus determined modulation and coding scheme is contained in a modulation and coding scheme request (MR), and sent to the base station 14 (S110).

Having received the modulation and coding scheme request from the mobile station 12, the base station 14 modulates the physical frame containing transmission data addressed to the mobile station 12, using the modulation and, coding scheme included in the modulation and coding scheme request or a modulation and coding scheme with a required SINR lower than that of the included modulation and coding scheme, and sends a communication signal containing the modulated physical frame and a modulation and coding scheme indicator (MI: MCR Indicator) indicating the modulation and coding scheme used in modulation of the physical frame to the mobile station 12 (S112).

In the above described embodiment, the mobile station 12 determines a modulation and coding scheme for a new communication signal to be sent from the base station 14, based not only on the SINR of the communication signal sent from the base station 14 but also on the received power difference between the received power of the control signal sent from the base station 14 and the received power of the control signal cyclically sent from the adjacent base station of the base station 14. With this arrangement, demodulation error of a communication signal due to a control signal cyclically sent from an adjacent base station can be reduced.

Note that the present invention is not limited to the above described embodiment.

For example, although it is assumed in the above description that the maximum received power of a signal sent from the base station 14 is the received power of a control signal, alternatively, the maximum received power of a signal sent from the base station 14 may be the received power of a signal other than a control signal (e.g., a communication signal).

Further, although a control signal cyclically sent from the adjacent base station is mentioned as an example of a strong input signal having a power stronger than the maximum received power of a signal sent from the base station 14 in the above described embodiment, the strong input signal may be any other signal arriving either cyclically or non-cyclically from a device other than the adjacent base station.

In this case, the strong input signal characteristic detecting unit 32 may detect the frequency with which the maximum received power of a signal arriving from a device different from the base station 14 exceeds the maximum received power of a signal sent from the base station 14, and the modulation and coding scheme determining unit 38 may determine a modulation and coding scheme for a new communication signal, based further on the frequency detected by the strong input signal characteristic detecting unit 32.

For example, the modulation and coding scheme determining unit 38 may determine a modulation and coding scheme for a new communication signal, based on whether or not the frequency detected by the strong input signal characteristic detecting unit 32 is equal to or larger than a predetermined value. With this arrangement, demodulation error of a communication signal due to a strong input signal arriving with a predetermined frequency or more often from a device different from the base station 14 can be preferably reduced.

Further, under a condition that a strong input signal keeps arriving with the frequency detected by the strong input signal characteristic detecting unit 32, the modulation and coding scheme determining unit 38 may compare an estimated throughput in a case where a modulation and coding scheme determined irrespective of the received power difference detected, by the received power difference detecting unit 30 is applied and that when a modulation and coding scheme determined based on the received power difference detected by the received power difference detecting unit 30 is applied, and determine whether or not it is necessary to change the modulation and coding method in order to increase the throughput.

The present invention is applicable not only to a mobile station but also widely to a receiving device of a wireless communication system employing an adaptive modulation scheme and an OFDMA system.

The invention claimed is:

1. A receiving device, comprising:
    received power control means for controlling a received power of a communication signal transmitted from a base station via at least one of subchannels according to an orthogonal frequency division multiple access system, depending on a maximum received power of a signal received together with the communication signal via any of the subchannels; and
    modulation and coding scheme determining means for determining a modulation and coding scheme for a new communication signal to be transmitted from the base station, based on signal quality of the communication signal subjected to the received power controlled by the received power control means,
    the receiving device for requesting the base station to transmit the new communication signal, using the modulation and coding scheme determined by the modulation and coding scheme determining means,
    the receiving device further comprising:
    received power difference detecting means for detecting a received power difference between the maximum received power of the signal transmitted from the base station and a maximum received power of a signal arriving from a device different from the base station,
    wherein the modulation and coding scheme determining means determines the modulation and coding scheme of the new communication signal, based further on the received power difference detected by the received power difference detecting means.

2. The receiving device according to claim 1, further comprising cycle detecting means for detecting a cycle in which the maximum received power of the signal arriving from the device different from the base station exceeds the maximum received power of the signal transmitted from the base station, wherein the modulation and coding scheme determining means determines the modulation and coding scheme for the new communication signal, based further on the cycle detected by the cycle detecting means.

3. The receiving device according to claim 2, wherein the modulation and coding scheme determining means determines the modulation and coding scheme for the new communication signal, based on the received power difference detected by the received power difference detecting means, at time points corresponding to the cycle detected by the cycle detecting means.

4. The receiving device according to claim 2, wherein the cycle detecting means detects the cycle in which a received power of a control signal sent from an adjacent transmitting device adjacent to the base station exceeds a received power of a control signal transmitted from the base station, and
    the received power difference detecting means detects a received power difference between the received power of the control signal transmitted from the base station and the received power of the control signal sent from the adjacent transmitting device.

5. The receiving device according to claim 1, further comprising frequency detecting means for detecting a frequency with which the maximum received power of the signal arriving from the device different from the base station exceeds the maximum received power of the signal transmitted from the base station,
wherein the modulation and coding scheme determining means determines the modulation and coding scheme for the new communication signal, based further on the frequency detected by the frequency detecting means.

6. The receiving device according to claim 5, wherein the modulation and coding scheme determining means determines the modulation and coding scheme for the new communication signal, based on whether or not the frequency detected by the frequency detecting means is equal to or larger than a predetermined value.

7. The receiving device according to claim 5,
wherein the modulation and coding scheme determining means compares, under a condition that the maximum received power of the signal arriving from the device different from the base station exceeds the maximum received power of the signal transmitted from the base station with the frequency detected by the frequency detecting means, an estimated throughput in a case where a modulation and coding scheme determined irrespective of the received power difference is applied and an estimated throughput in a case where the modulation and coding scheme determined based on the received power difference is applied,
wherein the modulation and coding scheme determining means determines the modulation and coding scheme for the new communication signal, based on a result of comparison.

8. A receiving method used in a mobile station, comprising:
a step of controlling a received power of a communication signal transmitted from a base station via at least one of subchannels according to an orthogonal frequency division multiple access system, depending on a maximum received power of a signal received together with the communication signal via any of the subchannels;
a step of detecting a received power difference between the maximum received power of the signal transmitted from the base station and a maximum received power of a signal arriving from a device different from the base station;
a step of determining a modulation and coding scheme for a new communication signal to be transmitted from the base station, based on signal quality of the communication signal subjected to the controlled received power and the detected received power difference; and
a step of requesting the base station to transmit the new communication signal, using the determined modulation and coding scheme.

* * * * *